United States Patent [19]

Shih et al.

[11] 4,354,927
[45] Oct. 19, 1982

[54] METHOD OF REMOVING CONTAMINANTS FROM HYDROCARBONACEOUS FLUIDS USING HIGH-SODIUM ALUMINA

[75] Inventors: Stuart S. Shih, Cherry Hill; Philip J. Angevine, West Deptford; Stephen M. Oleck, Moorestown, all of N.J.

[73] Assignee: Mobil Oil Corporation, New York, N.Y.

[21] Appl. No.: 222,851

[22] Filed: Jan. 6, 1981

[51] Int. Cl.$^3$ ...................... C10G 45/04; C10G 29/04
[52] U.S. Cl. .............................. 208/251 H; 208/253
[58] Field of Search .................. 208/251 H, 255, 143, 208/148, 253

[56] References Cited

U.S. PATENT DOCUMENTS

| | | | |
|---|---|---|---|
| 2,778,779 | 1/1957 | Donaldson | 585/434 |
| 3,432,565 | 3/1969 | Louwenhoven et al. | 208/143 |
| 3,494,857 | 2/1970 | McIlvried et al. | 208/143 |
| 3,730,877 | 5/1973 | Quik et al. | 208/143 |
| 3,751,515 | 8/1973 | Zadra | 208/143 |
| 3,804,750 | 4/1974 | Myers et al. | 208/251 H |
| 3,836,453 | 9/1974 | Kovach et al. | 208/143 |
| 3,865,716 | 2/1975 | Sosnouski | 208/255 |
| 3,954,603 | 5/1976 | Curtin | 208/251 H |
| 4,046,674 | 9/1977 | Young | 208/253 |
| 4,120,780 | 10/1978 | Morimoto et al. | 208/251 H |
| 4,141,820 | 2/1979 | Sullivan | 208/254 H |

*Primary Examiner*—Delbert E. Gantz
*Assistant Examiner*—Helane E. Maull
*Attorney, Agent, or Firm*—Charles A. Huggett; Michael G. Gilman; Charles J. Speciale

[57] ABSTRACT

Catalyst poisoning contaminants such as arsenic and selenium are removed from hydrocarbonaceous fluids particularly shale oil by contact with high-sodium alumina in the presence of hydrogen; saturation of conjugated diolefins is also effected.

12 Claims, No Drawings

METHOD OF REMOVING CONTAMINANTS FROM HYDROCARBONACEOUS FLUIDS USING HIGH-SODIUM ALUMINA

BACKGROUND OF THE INVENTION

1. Field of the Invention

This invention relates to a method for removing catalyst-poisoning impurities or contaminants such as arsenic and selenium, from hydrocarbonaceous fluids, particularly shale oil and fractions thereof. More particularly, the invention relates to a method of removal of such impurities by contacting the fluids with high-sodium alumina. The high-sodium alumina may be used as a guard bed material in a step preceding most refining operations, such as desulfurization, denitrogenation, catalytic hydrogenation, etc.

2. Description of the Prior Art

Due to scarcity of other hydrocarbon fuels and energy resources in general, shale oil and other hydrocarbonaceous fluids such as those derived from coal, bituminous sands, etc., are expected to play an increasing role in the production of commercial hydrocarbon fuels in the near future. Substantial effort is being devoted to the development of cost-efficient refining techniques for the processing of these hydrocarbonaceous fluids. Frequently, these fluids contain contaminants that poison and deactivate expensive and sensitive upgrading catalysts used in hydrogenation and other refining steps to which these hydrocarbonaceous fluids must be subjected before they can be satisfactorily used as sources of energy. In addition, the removal of contaminants such as arsenic may be necessary for environmental protection if the hydrocarbonaceous fluids are employed as fuels, as these contaminants form poisonous compounds.

The prior art has included several methods of removing arsenic from hydrocarbon-charged stocks, such as that described in U.S. Pat. No. 2,778,779 to Donaldson issued on June 14, 1952. Such methods have included the use of ferrous metal oxides to remove arsenic from streams of naturally occurring crude oil.

Other processes have been developed for the removal of arsenic in the parts per billion range from naphthas in order to protect sensitive reforming catalysts. Unfortunately, such processes cannot be applied to shale and other hydrocarbonaceous fluids which often have arsenic concentrations as high as 60 ppm.

Also known, are washing processes employing aqueous caustic solutions to precipitate arsenic salts from the hydrocarbonaceous fluid and extract them into the aqueous phase. See, e.g. U.S. Pat. No. 2,779,715 to Murray issued on Jan. 29, 1957 and D. J. Curtin et al. "Arsenic and Nitrogen Removal during Shale Oil Upgrading," A.C.S. Div. Fuel Chem., No. 23(4), 9/10-15/78. These processes, however, are relatively expensive, cause a substantial amount of fluid to be lost to the aqueous phase, contaminate the hydrocarbon fluid with aqueous solution and present a problem with regard to the disposal of waste caustic solution.

Many patents have issued which are directed to use of a metallic oxide and/or sulfide catalyst such as iron, nickel, cobalt or molybdenum oxide or sulfide or composites thereof on an alumina carrier to remove arsenic and other similar contaminants from shale oil. See, e.g. U.S. Pat. No. 4,003,829 to Burget et al. issued on Jan. 18, 1977, U.S. Pat. No. 4,141,820 to Sullivan issued on Feb. 27, 1979 and U.S. Pat. Nos. 3,954,603 to Curtin, 3,804,750 to Myers and 4,046,674 to Young. While these processes are effective, they employ relatively sophisticated and relatively expensive catalysts which considerably contribute to the processing costs of shale oil.

OBJECTS OF THE INVENTION

It is an object of this invention to provide an improved method for removing arsenic from hydrocarbonaceous fluids such as shale oil.

It is another object of this invention to provide an improved method for removing arsenic from a hydrocarbonaceous fluid having a relatively high arsenic content.

It is a further object of this invention to provide a process for removal of arsenic which does not entail use of an aqueous phase and mixing of said aqueous phase with the hydrocarbon.

It is yet another object of this invention to provide an improved method for removing arsenic and other contaminants from hydrocarbonaceous fluids, which method is inexpensive and does not substantially contribute to the processing cost of the fluids.

These and other objects will become apparent from the specification which follows.

SUMMARY OF THE INVENTION

It has now been found that the content of at least one of arsenic and selenium, in a hydrocarbonaceous fluid can be reduced by: contacting the fluid with a particulate porous catalyst consisting essentially of alumina having a sodium content ranging between 0.1 and 10% by weight in the presence of hydrogen, at a temperature ranging from about 230° to 475° C. and at a pressure ranging from about 10 to 200 atm. The iron content of the fluid is also reduced by this process. Moreover, it has been found that the diolefin content of the fluid can be significantly reduced.

DETAILED DESCRIPTION OF THE INVENTION

The invention may be practiced in a guard bed chamber preferably having a fixed bed of porous particulate material, but a fluidized bed may also be used. The particulate material consists essentially of high sodium alumina, i.e. alumina containing about 0.1 to 10 percent, and preferably about 0.5 to 5 percent sodium by weight, and most preferably about 1 to 3 percent sodium by weight. Alpha or beta alumina may be used, but gamma alumina is preferred because of its small pore size and high surface area.

Any alumina having the requisite sodium content may be used, but low sodium alumina may be converted to high sodium alumina suitable for purposes of this invention by e.g., impregnation with sodium carbonate or other suitable sodium compounds and subsequent calcination.

A suitable alumina product for use in the method of the present invention has been prepared in the following manner: 1,341 grams of alpha alumina monohydrate powder, a product commercially available under the trade name of Kaiser Substrate Alumina (SA), marketed and distributed by Kaiser Chemicals, was mixed with 984 grams of water in a muller-mixer. The mixture was extruded to one-sixteenth inch diameter particles, having an L/D ratio of 3/1, dried at 121° C. and calcined for 4 hours at 538° C. The chemical analysis of the powder used was:

| | |
|---|---|
| Na$_2$O | 0.03% |
| Bayerite | 2.00% |
| Fe$_2$O$_3$ | 0.06% |
| SiO$_2$ | 0.10% |
| Cl | 0.10% |
| SO$_4$ | 0.05% |

Percent Loss on Ignition—27

The extrudate product had the following properties:

| Density, g/cc | |
|---|---|
| Packed | 0.51 |
| Particle | 0.93 |
| Real | 3.38 |
| Pore Volume, cc/g | 0.785 |
| Surface Area m$^2$/g | 231 |
| Avg. Pore Diameter, Å | 136 |

| Pore Volume Distribution By Mercury Porosimeter | |
|---|---|
| PV % in Pores of Diameter (Å) | |
| 0–30 | 8 |
| 30–50 | 6 |
| 50–80 | 20 |
| 80–100 | 12 |
| 100–150 | 50 |
| 150–200 | 1 |
| 200–300 | 1 |
| 300+ | 2 |

The thus prepared extrudate was impregnated to incipient wetness with 134 ml of sodium carbonate solution containing 4.1 grams of anhydrous sodium carbonate, dried at 121° C. and calcined in flowing air for 3 hours at 538° C.

Other commercially available particle sizes and shapes may be used. The preferred diameter is 1/16 inch and a preferred L/D ratio is 2–4. The shape of the particles is not critical in the present invention.

The guard bed may be situated in a guard chamber, a closed metal vessel capable of being pressurized. The particles must be operable to promote deposition of the contaminants thereon and to promote diolefin saturation when contacted by the hydrocarbonaceous feed under a reducing atmosphere provided by hydrogen at a pressure between 10 and 200 atmospheres, preferably between 30 and 130 atmospheres, and at a temperature between 230° and 475° C., preferably between 280° and 370° C. As is well known, diolefins cause reactor fouling at temperature above 315° C.

The hydrocarbonaceous feed is preferably admixed with hydrogen at a ratio ranging from 150 to 1780 SCM of H$_2$/M$^3$ of feed and preferably 350 to 900 SCM of H$_2$/M$^3$ of feed and the admixed feed is contacted with the particles for a time sufficient to reduce the arsenic and other contaminant content to acceptable levels.

The quantity of catalyst in the bed should be sufficient to keep the Liquid Phase Hourly Space Velocity (LHSV), measured in units of volumetric flow rate of feed per unit volume of catalyst, between the values of 0.1 and 10 and preferably between those of 0.5 and 3. This LHSV range corresponds to a residence time for the feed in the catalyst bed ranging between 0.1 and 10 hours and preferably 0.33 to 5 hours.

The diene number of the feed or product is expressed in grams of iodine equivalent to the maleic anhydride consumed by 100 g of sample in a Diels-Alder reaction in a toluene medium, to form addition products, and is measured according to known methods disclosed by Ellis and Jones, Analyst, 61, 812–816 (1936) and Mc-Kinney, Halbrook & Rose, Oil and Soap, 19, 141–3 (1942).

The arsenic content of the feed and product is expressed in parts per million (ppm) and is measured by inductively-coupled plasma atomic emission spectroscopy by wet-oxidizing a sample in a Kjeldahl Flask, dissolving into 5% HCl and exciting the solution in an inductively-coupled argon plasma. The emitted light is of wavelengths characteristic of the element present and proportional to their concentrations. The radiation (1937.0 Å for Arsenic) is measured spectrophotometrically and the arsenic concentration is thus determined.

Without wishing to be bound by any theory, the postulated reason for the effectiveness of the process of this invention is that the presence of sodium on the catalyst surface serves to reduce the acidity of said surface and thereby promote deposition of arsenic particles and/or compounds thereon, as well as favor the diene saturation reaction.

The invention may be further illustrated by one or more of the Examples which follow:

EXAMPLE I

Paraho (direct fired) shale oil having a boiling range (initial boiling point/50% fraction/95% fraction) of 170/390/505° C., containing 36 ppm arsenic and having a diene number of 53, was fed into a pilot size downflow guard chamber containing a fixed bed of alumina with a sodium content of 1% by weight at 1 or 2 LHSV, at a temperature ranging from 288° to 371° C. and at 68 atmospheres pressure. The rate of hydrogen circulation was 890 SCM/m$^3$ of oil.

A control run was conducted using identical conditions except that the sodium content was 0.03 percent by weight. The results are summarized in Tables 1 and 2.

EXAMPLE II

Occidental (in situ) shale oil having a boiling range (initial boiling point/50% fraction/90% fraction) of 190/370/512° C. containing 28.1 ppm arsenic and having a diene number of 22 was fed into a guard bed similar to that of Example 1 and was treated under identical conditions at a liquid phase space velocity (LHSV) of one. The results are summarized also in Table 1.

TABLE 1

| Temperature °C.: | 288 | 316 | 343 | 371 |
|---|---|---|---|---|
| LHSV | 1 | 1 | 1 | 1 |
| Paraho Shale Oil | | | | |
| Arsenic in Product (ppm) | | | | |
| 0.03% Na | 25 | 14.6 | 8.4 | 6.1 |
| 1.0% Na | 14.3 | 11.1 | 8.3 | 5.7 |
| Diene No. in Product | | | | |
| 0.03% Na | 39 | 39 | 39 | 41 |
| 1.0% Na | 22 | 42 | 65 | 63 |
| Occidental Shale Oil | | | | |
| Arsenic in Product (ppm) | | | | |
| 0.03% Na | 22.9 | 17.0 | 13.4 | 10.0 |
| 1.0% Na | 17.7 | 15.5 | 12.5 | 9.7 |
| Diene No. in Product | | | | |
| 0.03% Na | 21 | 20 | 21 | 19 |
| 1.0% Na | 5 | 8 | 15 | 14 |

TABLE 2

| Temperature (°C.) | 316 | 343 | 372 |
|---|---|---|---|
| LHSV | 2 | 2 | 2 |
| Paraho Shale Oil | | | |
| Arsenic in Product (ppm) | | | |

TABLE 2-continued

| | | | |
|---|---|---|---|
| 0.03% Na | 30.5 | 17.2 | 8.1 |
| 1.00% Na | 16.1 | 10.8 | 7.6 |
| Diene No. in Product | | | |
| 0.03% Na | 47 | 53 | 45 |
| 1.00% Na | 30 | 48 | 39 |

As can be seen from the tabulated results above, considerable dearsenation takes place by practice of this process. There is a marked difference in extent of dearsenation when high-sodium alumina is used, compared to use of low-sodium alumina. However, this difference becomes less significant as the reactor temperature increases. This is so because the dearsenation reaction is favored by higher temperatures (and longer residence times, i.e. lower LHSV). Unfortunately, formation of undesirable dienes is also favored by higher temperatures. Thus, whereas at low temperatures (and low residence times) a reduction in diene number can and does accompany dearsenation and is greater when high-sodium alumina is used, such reduction may not be observed at very high temperatures (and very high residence times).

Therefore, a compromise must be made between these competing considerations when determining operating temperature for the guard bed and LHSV for the system. Use of high-sodium alumina makes it possible to choose a lower temperature than that which would have been required by a low-sodium process in order to achieve a tolerable product arsenic content. In addition, the low cost of alumina and its sodium impregnation makes it acceptable as a disposable catalyst, though regeneration can be effected by known methods.

Although the invention has been described in conjunction with specific embodiments thereof, it is evident that many alternatives and variations will be apparent to those skilled in the art in light of the foregoing description. Accordingly, it is intended to embrace all such alternatives and variations that fall within the spirit and scope of the appended claims.

What is claimed is:

1. A method for reducing contaminant content of a hydrocarbonaceous fluid, said contaminant being selected from the group consisting of arsenic and selenium, said method comprising:

contacting said fluid with a particulate, porous catalyst consisting essentially of alumina having a sodium content between 0.1 and 10 percent by weight, in the presence of hydrogen, at a temperature ranging between about 230° and 475° C. and a pressure ranging between about 10 and 200 atmosphere.

2. The method of claim 1 wherein said alumina is gamma alumina.

3. The method of claim 1 wherein said temperature ranges between about 280° and 370° C.

4. The method of claim 1 wherein said pressure ranges between about 30 and 140 atmospheres.

5. The method of claim 1 wherein said sodium content ranges between about 0.5 and 5 percent by weight.

6. The method of claim 1 wherein the contact time of said fluid and said catalyst ranges between about 1 and 10 hours.

7. The method of claim 1 wherein said contacting takes place in a guard bed reactor with a fixed catalyst bed.

8. The method of claim 1 wherein said contacting takes place in a guard bed reactor with a free catalyst bed.

9. The method of claim 1 wherein said time of contact ranges between about 0.3 and 5 hours.

10. The method of claim 6 wherein hydrogen is circulated at a rate between 150 and 1780 $m^3/m^3$ of fluid processed.

11. The method of claim 6 wherein hydrogen is circulated at a rate of about 350 to 900 $m^3/m^3$ of fluid processed.

12. The method of claim 1 wherein said fluid is shale oil.

* * * * *